(12) United States Patent
Kemper

(10) Patent No.: US 6,982,631 B2
(45) Date of Patent: Jan. 3, 2006

(54) AUTOMOTIVE SECURITY SYSTEM WITH SELF-BIASING BYPASS IMMOBILIZER

(75) Inventor: Jonathan T. Kemper, San Diego, CA (US)

(73) Assignee: Directed Electronics, Inc., Vista, CA (US)

( * ) Notice: Subject to any disclaimer, the term of this patent is extended or adjusted under 35 U.S.C. 154(b) by 45 days.

(21) Appl. No.: 10/750,153

(22) Filed: Dec. 30, 2003

(65) Prior Publication Data

US 2005/0146218 A1    Jul. 7, 2005

(51) Int. Cl.
*B60R 25/04* (2006.01)
(52) U.S. Cl. .................... 340/426.11; 307/10.3
(58) Field of Classification Search ........... 340/426.11; 307/10.3; 180/287
See application file for complete search history.

(56) References Cited

U.S. PATENT DOCUMENTS

| | | | | |
|---|---|---|---|---|
| 3,628,056 A | * | 12/1971 | Buchanan | ............. 307/10.3 |
| 3,654,602 A | * | 4/1972 | Jones | ............. 307/10.3 |
| 3,783,303 A | * | 1/1974 | Johnson, Jr. | ............. 307/10.3 |
| 4,739,736 A | * | 4/1988 | Branco | ............. 123/179.3 |
| 4,792,792 A | * | 12/1988 | Costino | ............. 307/10.3 |
| 4,842,093 A | * | 6/1989 | Lerche et al. | ............. 180/287 |
| 4,992,670 A | * | 2/1991 | Pastor | ............. 307/10.3 |
| 5,061,915 A | * | 10/1991 | Murphy | ............. 340/426.12 |
| 5,519,376 A | * | 5/1996 | Iijima | ............. 340/426.35 |
| 5,539,260 A | * | 7/1996 | Khangura et al. | ............. 307/10.3 |
| 6,181,026 B1 | * | 1/2001 | Treharne et al. | ............. 307/10.3 |
| 6,744,148 B2 | * | 6/2004 | Kees et al. | ............. 307/10.3 |
| 2004/0004397 A1 | * | 1/2004 | Nagae et al. | ............. 307/10.3 |

* cited by examiner

*Primary Examiner*—Jeffery Hofsass
*Assistant Examiner*—Anne V. Lai
(74) *Attorney, Agent, or Firm*—K C Bean, Esq.; Anatoly S. Weiser, Esq.

(57) ABSTRACT

A vehicle immobilizer disables a vehicle's system after receiving from a vehicle security system two immobilizer control signals in predetermined states. The vehicle's system is a necessary system for the vehicle to run, for example, an ignition system or an engine computer, so that the vehicle is immobilized when the necessary system is disabled. The immobilizer includes switching and self-biasing circuits that bypass the security system. Bypassing the security system reduces the likelihood of immobilizing a running vehicle because of a security system malfunction.

59 Claims, 2 Drawing Sheets

AUTOMOTIVE SECURITY SYSTEM WITH SELF-BIASING BYPASS IMMOBILIZER

FIELD OF THE INVENTION

The present invention relates generally to security systems for vehicles. More particularly, the invention relates to automotive security systems with immobilizer devices.

BACKGROUND

Automotive security systems often include immobilizer devices, i.e., devices that prevent unauthorized use of a vehicle. Generally, an immobilizer protects a vehicle in one of three ways: (1) disabling the vehicle's starter circuit to prevent unauthorized starting of the vehicle; (2) disabling the vehicle's ignition system, engine computer, or another system necessary for the vehicle to run ("necessary system"); or (3) disabling both the starter circuit and the engine computer or another necessary system.

Because of safety concerns, care should be exercised when immobilizing a running vehicle. For example, it is considered preferable to disable the vehicle's engine after the vehicle reaches a full stop, or is near a full stop. But even an immobilizer properly designed not to disable an engine in a moving vehicle can malfunction. The malfunction can be a simple software "glitch" from which the immobilizer can recover, or it can be a complete failure, such as a power disconnect. Whatever the nature of the malfunction or failure, it can lead to disabling the vehicle while it is moving. It is desirable to provide an immobilizer device that reduces the likelihood of disabling a running vehicle in the event of immobilizer malfunction.

One immobilizer design relies on normally closed relay contacts in a circuit that enables a necessary system, for example, the ignition system. When the relay is de-energized, the normally closed contacts are held in contact with each other by a spring. Such structure, however, has a self-resonant frequency. Therefore, the contacts can come apart due to external vibration and shock. For example, the normally closed contacts can come apart when the relay vibrates at a frequency that is close to the self-resonant frequency of the contacts-spring structure, or when the relay is subjected to a sudden shock of short duration, which approximates a delta function and has one or more spectral components near the self-resonant frequency. In comparison, normally open contacts held together by electromagnetic force provide a more reliable connection. It follows that immobilizer design that relies on normally closed contacts renders the ignition circuit (or another necessary system connected to the immobilizer) susceptible to environmental effects, such as shock and vibration, and more prone to failure. It would be desirable to provide an immobilizer device that does not rely on normally closed relay contacts.

The immobilizer can also malfunction when the vehicle it not running, possibly preventing subsequent starting of the vehicle. Some prefer that the vehicle not be operable when a malfunction occurs, particularly when the malfunction is caused by a power disconnect; this is generally the case in the United Kingdom and other European countries. In contrast, others prefer that the vehicle be drivable until the security system is repaired; this is generally the case in the United States. It would be desirable to provide an immobilizer circuit that could be easily configured for each of these preferences, and that would reduce the likelihood of immobilizer malfunction causing a failure mode contrary to the configured preference.

A need thus exists for immobilizer-equipped security systems that reduce the likelihood of disabling a running vehicle because of immobilizer malfunction, but do not rely upon normally closed relay contacts to accomplish this. Still another need exists for immobilizer-equipped security systems that can be easily configured either to prevent or to allow a non-running vehicle to start in the event of immobilizer failure or a deliberate attempt to disable the immobilizer function, while at the same time protecting against unintentionally disabling a running vehicle due to immobilizer malfunction.

SUMMARY

The present invention is directed to apparatus and methods that satisfy one or more of these needs. In one embodiment, the invention herein disclosed is a vehicle immobilizer having one for more relays, each containing one or more normally open contacts. Each relay includes a coil that, when energized by a voltage source, creates a magnetic field that closes the normally open contacts of the relay. For each relay, each pair of normally open contacts is connected in series with an existing automotive electrical circuit such that this circuit is completed when the relay coil is energized, and the circuit is disconnected when the relay coil is not energized. To perform a dual point immobilizer function, one set of relay contacts is generally connected in series with the engine starter solenoid, and the remaining relay contacts are connected to one or more of the following existing automotive circuits: Ignition Power Relay, Ignition Switch, Ignition Coil voltage, Fuel Pump control voltage, Fuel Injector solenoid voltage, Engine Control Module power, Body Control Module power, or Ignition Key Immobilizer Module voltage.

The immobilizer also includes a control circuit with a first immobilizer connection receiving a first immobilizer input signal, a second immobilizer connection receiving a second immobilizer input signal, the second immobilizer connection being coupled to the second solenoid input, and a switch. The switch, for example a MOSFET switching circuit, is coupled between the second solenoid input and a ground of the immobilizer circuit. The switch includes a switch control input coupled to the first immobilizer connection, so that the first immobilizer input signal controls state of the switch, the switch grounding the second solenoid input when the first immobilizer input signal is in a first state, the first state corresponding to voltage exceeding the first predetermined level.

The immobilizer further includes a biasing circuit providing a biasing voltage from the second contact of the relay to the switch control input so that the switch grounds the second solenoid input when the first and second contacts are closed and the first immobilizer input signal assumes a high impedance state. The biasing circuit has a first resistor coupled between the switch control input and ground, and a second resistor with a first end and a second end. The first end of the second resistor is coupled to the switch control input; the second end of the second resistor is coupled through a first diode to the second contact of the relay. The biasing circuit further includes a jumper receptacle and a second diode coupled in series between the first voltage source and the second end of the second resistor. The first and second diodes are oriented so as to prevent reverse current flow between the first and second contacts through the first and second diodes, while allowing the first voltage to provide bias to the switch control input.

These and other features and aspects of the present invention will be better understood with reference to the following description and appended claims.

DETAILED DESCRIPTION

Figure 1:
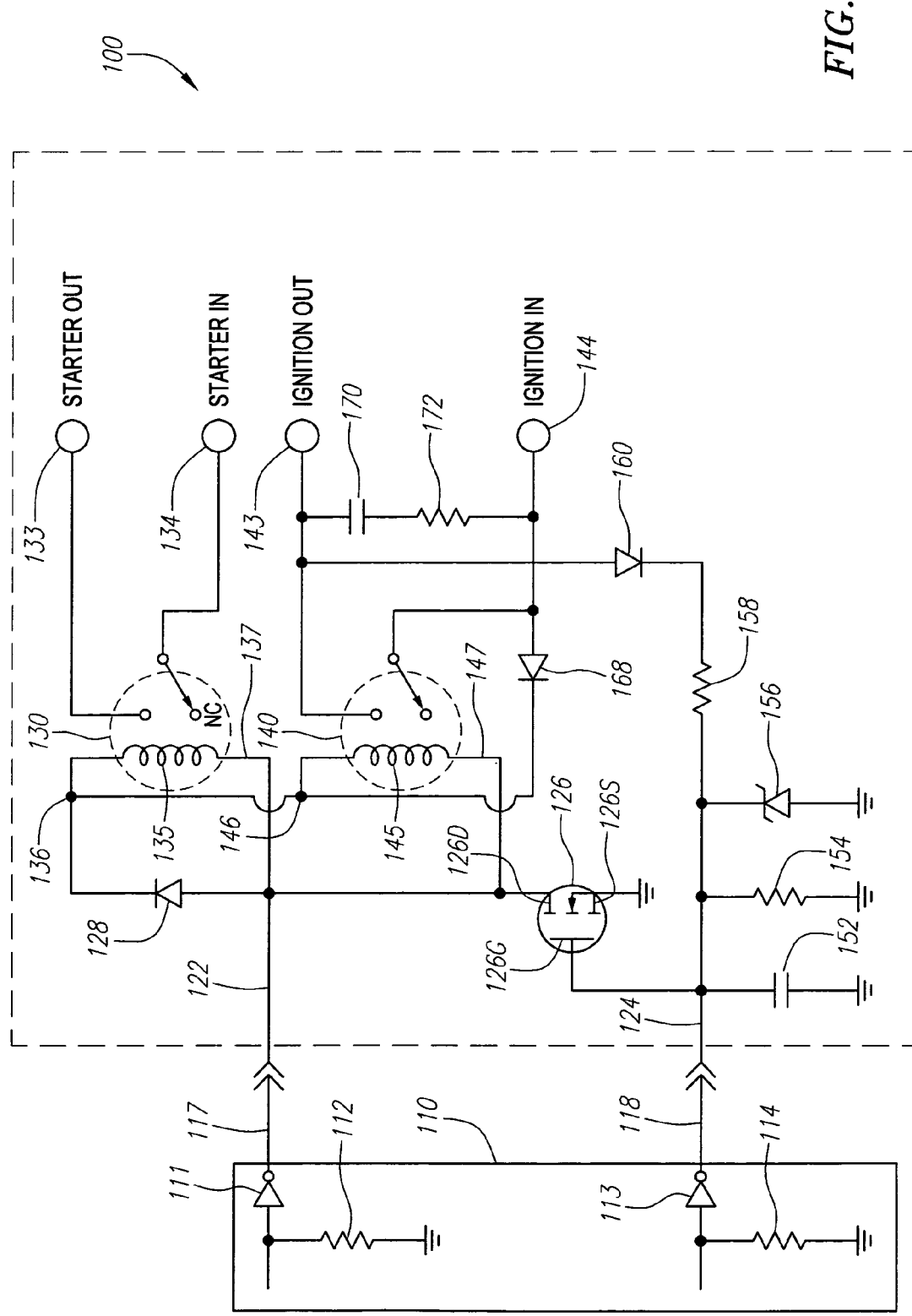
FIG. 1 is a simplified schematic diagram of a combination of an automotive security system and a vehicle immobilizer, in accordance with the present invention.

Reference will now be made in detail to several embodiments of the invention that are illustrated in the accompanying drawings. Wherever possible, same or similar reference numerals are used in the drawings and the description to refer to the same or like parts. The drawings are in simplified form, not to scale, and omit many apparatus elements and method steps that can be added to the described systems and methods, while including many optional elements. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention in any manner.

Referring more particularly to the drawings, FIG. 1 is a high-level schematic diagram illustration of a vehicle immobilizer 100 in combination with an automotive security system 110, in accordance with the present invention. The vehicle immobilizer 100 includes relays 130 and 140. Normally open contacts 133 and 134 of the relay 130 are connected in series with the starter system of the vehicle, while normally open contacts 143 and 144 of the relay 140 are inserted in series with the ignition switch of the vehicle. In this way, both the starter and ignition vehicle systems are enabled when the contacts 133/134 and 143/144 are closed, and both systems are disabled when the contacts are open. In alternative embodiments, the contacts of the relays 130 and 140 are connected in series with one or more other necessary systems of a vehicle, for example, the vehicle's engine computer.

The relays 130 and 140 are controlled by energizing and de-energizing their respective solenoids, 135 and 145, which are connected in parallel. Solenoid control connections 136 and 146 are biased through a diode 168 by a voltage appearing on a contact 144 of the relay 140. This contact is tied to an ignition lock of the vehicle, so that a high voltage (e.g., about 12 volts) appears on the contact 144 whenever a car key is inserted into the ignition lock of the vehicle to enable the ignition system. An immobilizer control signal appears on the other side of the solenoids 135 and 145, i.e., on solenoid control connections 137 and 147. The relays 130 and 140 become energized and close their normally open contacts 133/134 and 143/144 when the potential difference across the relays' solenoids 135 and 145 exceeds some predetermined activation potential. Thus, the relays will close the contacts 133/134 and 143/144 when the immobilizer control signal assumes a low voltage state (logic 0). The relays 130 and 140 open the contacts 133/134 and 143/144 when the immobilizer control signal assumes a high voltage state (logic 1). Because the contacts 143 and 144 are inserted in series with the ignition system of the vehicle, and the contacts 133 and 134 are inserted in series with the starter system of the vehicle, these vehicle systems are enabled when the immobilizer control signal is in the low voltage state and the vehicle's key lock is in the Ignition On position. The ignition and starter systems are disabled when the immobilizer control signal is in the high voltage state.

The immobilizer 100 is also connected to the automotive security system 110, which generates immobilizer signals 117 and 118. In the illustrated embodiment, the immobilizer signals 117 and 118 are output by inverting open collector or open drain transistor buffers 111 and 113, respectively. The inputs to the inverting buffers 111 and 113 are connected to pull-down resistors 112 and 114, and are driven by configurable input/output (I/O) pins of a microcontroller of the security system. The microcontroller is not shown in FIG. 1.

The security system's microcontroller determines when to immobilize the vehicle in which the security system 110 and the immobilizer 100 are installed. For example, the security system 110 can monitor sensors, such as the vibration, glass break, door lock, hood, trunk, ignition, and speed sensors, and decide that the sensor readings indicate unauthorized use or attempted use of the vehicle. The security system then chooses appropriate response, for example, immobilizing the vehicle immediately or when the vehicle is at or near a complete stop. To immobilize the vehicle, the security system drives the input/output pins of its microcontroller connected to the inverting buffers 111 and 113 to low and high voltages, respectively. In the illustrated embodiment, the high voltage corresponds to a logic 1, while the low voltage corresponds to a logic 0. Thus, the inverting buffer 111 receives a logic 0, and the inverting buffer 113 receives a logic 1. Because the buffers 111 and 113 are inverting, the signals 117 and 118 are at a logic 1 level (high voltage) and logic 0 level (low voltage), respectively.

The two immobilizer signals 117 and 118 can be considered to be separate components of a single two-line immobilizer signal controlled by the microcontroller of the security system 110. In various other embodiments of the security system-immobilizer combination in accordance with the present invention, the interface between the security system and the immobilizer includes an immobilizer signal with both more and fewer than two components.

The vehicle immobilizer 100 receives the immobilizer signals 117 and 118 at immobilizer control inputs 122 and 124. The input 122 is connected to the drain 126D of a field effect transistor switch 126, and to the solenoid control connections 137 and 147. The source 126S of the transistor switch 126 is grounded; its gate 126G is connected to the immobilizer control input 124. In this configuration, a high voltage (logic 1) at the immobilizer control input 124 will induce (or enhance) the channel of the transistor switch 126, putting the transistor 126 in a conductive state and effectively shorting the drain 126D and the source 126S. The immobilizer control signal at the drain 126D will therefore be grounded. Note the immobilizer control signal will be grounded by a logic 1 on the input 124 regardless of the state of the signal at the immobilizer input 122. Conversely, a low voltage (logic 0) at the immobilizer control input 124 will pinch off the channel of the transistor switch 126 near the gate 126G, effectively opening the transistor switch 126 between the drain 126D and the source 126S. In the latter case, the voltage at the drain 126D will be determined by the state of the immobilizer signal 117 at the input 122.

For ease of reference, table 1 immediately below relates the immobilizer control signal to defined states of immobilizer signals 117 and 118, and to the overall status of the immobilizer 100.

TABLE 1

| Immobilizer Signal 117 | Immobilizer Signal 118 | Immobilizer Control Signal | Immobilizer State |
|---|---|---|---|
| 0 (low) | 0 (low) | 0 (low) | RUN BYPASS |
| 0 (low) | 1 (high) | 0 | RUN DELIBERATE |
| 1 (high) | 0 (low) | 1 (high) | IMMOBILIZE |
| 1 (high) | 1 (high) | 0 (low) | RUN BYPASS |

As is apparent from Table 1, the immobilizer control signal assumes the value of 1, which corresponds to disabling the starter and ignition systems of the vehicle, only when the signal 117 is high and the signal 118 is low. This state is descriptively named "IMMOBILIZE" because the ignition system is a necessary system of the vehicle, and disabling it also disables the vehicle. In the "RUN DELIBERATE" state, the security system causes the signals 117 and 118 to assume 0 and 1 states, respectively, causing the immobilizer to energize the relays 130 and 140, enabling the vehicle's systems. In the two "RUN BYPASS" states, the signals 117 and 118 assume the same value, either 1 or 0. Typical security system failure modes, such as a burned fuse, a software glitch, or expiration of a watchdog timer, are likely to cause both signals 117 and 118 to assume the same state. Advantageously, in the illustrated embodiment such security system failures will not prevent the vehicle's systems from functioning. It should be noted, however, that in certain embodiments of the invention identical levels of the immobilize signals correspond to the "IMMOBILIZE" and/or "RUN DELIBERATE" states, rather than the "RUN BYPASS" state.

The truth Table 1 does not account for undefined states of the signals 117 and 118, such as a high impedance state. To reduce the probability of unintentionally disabling the vehicle's systems, the immobilizer 100 provides a self-biasing circuit to keep the immobilizer control signal at a low voltage level under various conditions when the immobilizer signals 117 and 118 are not driven to "hard" ones or zeros by a low-impedance source.

The self-biasing circuit Includes a diode 160 and resistors 154 and 158 coupled in series between the contact 143 of the relay 140 and the ground. Whenever the contacts 143 and 144 are closed and the vehicle's key enables the ignition circuit—e.g., when the vehicle is running—the ignition voltage (12 volts, for example) that appears on the contact 144 is transferred to the contact 143 and to the voltage divider formed by the resistors 154 and 158. The voltage at the junction of the resistors 154 and 158 then biases the gate 126G of the transistor switch 126, turning on the transistor switch 126.

A capacitor 152 and the resistors 154 and 158 form a low-pass filter that suppresses high frequency noise on the gate 126G, thereby preventing falsing (i.e., instances of unintended changes of state) of the immobilizer 100. The zener diode 156 provides transient overvoltage protection to the gate 126G, clamping high transient voltages on the gate 126 and keeping the gate-to-source MOS barrier of the transistor switch 126 intact.

Values of the resistors 154 and 158 are selected so that the voltage at the gate 126G is sufficient to forward-bias the transistor switch 126. At the same time, the resistor values are chosen so that the inverting buffer 113 can override the bias of the gate 126G provided by the self-biasing circuit, allowing the security system 110 to control the operation of the immobilizer 100. Additionally, the values of the resistors 154 and 158 and of the capacitor 152 are selected so that the frequency response of the low-pass filter formed by these elements has an appropriate pass band. In one exemplary variant of the embodiment of FIG. 1, the pass band of the low-pass filter is about 2 Kilohertz (KHz). In other variants, the pass band is between about 1 and 50 KHz.

Three other components appear in FIG. 1 and deserve a brief mention. A diode 128 is coupled across the solenoids 135 and 145 of the relays 130 and 140. The diode 128 is oriented to be reverse-biased when the relays 130 and 140 are energized. Functionally, the diode 128 clips the high voltage spikes of the back electromotive force (back EMF) generated in the solenoids 135 and 145 when the relays 130 and 140 are de-energized, reducing radio frequency interference (RFI) and preventing the spikes from damaging the immobilizer 100 and other electrical circuits of the vehicle.

Similarly, a capacitor 170 and a resistor 172 are coupled in series across the contacts 143/144 to suppress transients that can result when the relay 140 opens these contacts.

The self-biasing circuit of the immobilizer 100 thus uses the Ignition In voltage from the contact 144 to bias the transistor switch 126 in the ON (closed or conducting) state when the contacts 143 and 144 are closed, e.g., when the relay 140 is energized by the ignition system of the vehicle.

When the relay 140 is de-energized, the contacts 143 and 144 are open, and the Ignition In voltage is no longer provided to the self-biasing circuit through the diode 160. If the security system fails with the ignition turned off and the immobilizer signals 117 and 118 in an undetermined (high impedance) state, the immobilizer control signal at the drain 126D will (or may) become high, disabling both vehicle systems connected through the contacts of the relays 130 and 140. This is a high-security mode of failure, preferred in some venues, particularly in the United Kingdom.

Figure 2:
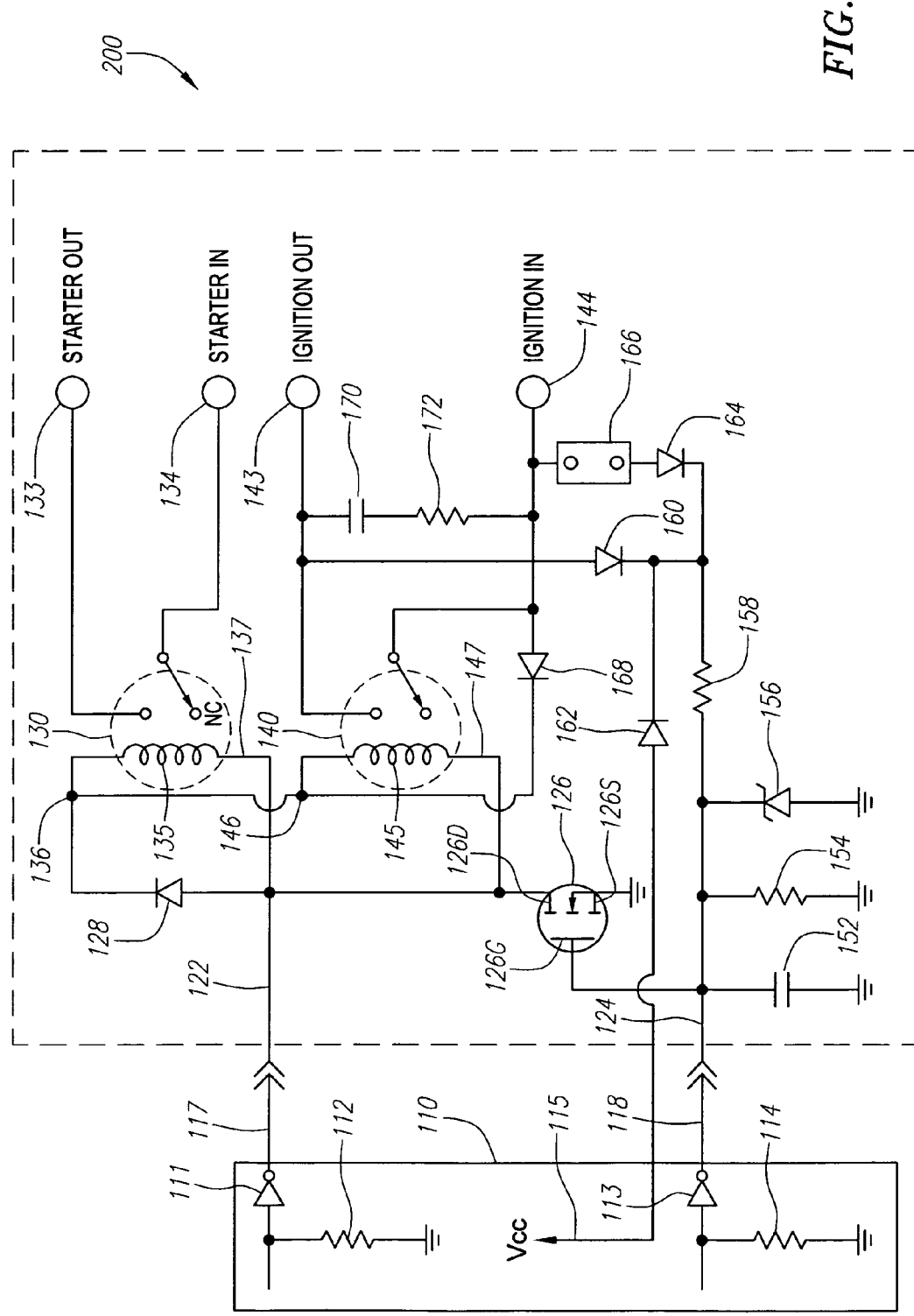
FIG. 2 is a simplified schematic diagram of a combination of an automotive security system and a vehicle immobilizer with configurable failure mode capability, in accordance with the present invention.

Elsewhere, the preference runs to enabling operation of the vehicle when the security system fails, so that the vehicle can be driven to a dealership or another repair facility. FIG. 2 illustrates, in a high-level schematic diagram form, a combination of an immobilizer 200 with a security system 110 that can be configured to accommodate both preferences.

The immobilizer 200 is similar to the immobilizer 100 described above, but also includes a configurable redundant path from the contact 144 to the voltage divider formed by the resistors 154 and 158. The configurable redundant path is through a diode 164 and jumper terminals (jumper receptacle) 166. When a jumper is inserted into the terminals 166, the Ignition In voltage is provided to the self-biasing circuit regardless of whether the contacts 143 and 144 are open or closed. In this configuration, the self-biasing circuit allows the relay 140 initially to close the contacts 143 and 144 after a malfunction of the security system 110, as compared to keeping the contacts 143 and 144 closed after the malfunction.

The immobilizer 200 also includes a second redundant path providing a voltage to the self-biasing circuit. This second redundant path is through a diode 162 connected to a supply voltage rail 115 of the security system 110. Thus, the self-biasing circuit will allow the contacts of the relays 130 and 140 initially to close after failure of the security system if the failure does not impair the voltage on the supply voltage rail 115.

A listing of the values or part numbers of the components that can be used in an immobilizer embodiment of FIG. 2 is presented in Table 2 below.

TABLE 2

| 1 | Inverting Buffers 111 & 113 | 2003 A |
|---|---|---|
| 2 | Resistors 112 & 114 | 330 KΩ |
| 3 | Transistor Switch 126 | 15 V NTF3055-100 |
| 4 | Diodes 128, 160, 162, 164, & 168 | 4005 |
| 5 | Capacitors 152 & 170 | .01 µF |
| 6 | Resistors 154 & 158 | 100 KΩ |
| 7 | Zener Diode 156 | ZMM5245BCT |
| 8 | Resistor 172 | 9.1 Ω |

This document describes the inventive apparatus and methods for immobilizing vehicles in considerable detail for illustration purposes only. Neither the specific embodiments and methods of the invention as a whole, nor those of its features limit the general principles underlying the invention. The specific features described herein may be used in some embodiments, but not in others, without departure from the spirit and scope of the invention as set forth. Various physical arrangements of components and various step sequences also fall within the intended scope of the invention. In particular, the invention is not limited to the use of multiple relays, but can use a single relay or another switching element, e.g., a solid-state switch, to selectively enable and disable one or more necessary systems (ignition, engine computer) of a vehicle. The control circuit of the switching transistor 126 and the self-biasing circuit also need not be implemented using the specific scheme used in the illustrated embodiments, as should be apparent to a person of ordinary skill in the art. Furthermore, in the description and the appended claims the words "couple," "connect," and similar expressions with their inflectional morphemes do not necessarily import an immediate or direct connection, but include connections through mediate elements within their meaning. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function has been reserved for the claims and their equivalents.

I claim:

1. A vehicle immobilizer device, comprising:
    a switching element comprising first and second contacts electrically connected to a first system of a vehicle so that operation of the first system can be enabled when the first and second contacts are held together, and so that the first system is not operable when the first and second contacts are apart, the first contact being connected to a first source carrying a first voltage, the switching element further comprising a control input capable of receiving a control signal, the switching element causing the first and second contacts to be held together when the control signal is in a first control signal state and causing the first and second contacts to be brought apart when the control signal is not in the first control state;
    a connection receiving an immobilizer signal from a security system, the immobilizer signal assuming a first immobilizer signal state when the security system determines to disable the vehicle, the immobilizer signal causing the control signal to assume the first control state when the immobilizer signal is not in the first immobilizer state; and
    a biasing circuit receiving the first voltage through the first and second contacts and causing the control signal to assume the first control state when the second contact is connected to the first source through the first contact and the immobilizer signal is not in the first immobilizer state.

2. A vehicle immobilizer device according to claim 1, wherein the switching element is in an energized state when the control signal assumes the first control signal state, and the first switching element is in a de-energized state when the control signal is not in the first control signal state.

3. A vehicle immobilizer device according to claim 1, wherein the switching element comprises a relay and the first and second contacts are normally open contacts of the relay.

4. A vehicle immobilizer device according to claim 1, wherein the first contact is connected to the first source through a switch.

5. A vehicle immobilizer device according to claim 4, further comprising a connection from a supply voltage rail of the security system to the biasing circuit, the connection from the supply voltage rail causing the control signal to assume the first control state when the immobilizer signal is not in the first immobilizer state and the security system receives electrical power.

6. A vehicle immobilizer device according to claim 4, further comprising a terminal set capable of receiving a removable jumper, the terminal set connecting the first voltage to the biasing circuit through the removable jumper to cause the control signal to assume the first control state when the jumper is inserted into the terminal set and the immobilizer signal is not in the first immobilizer state.

7. A vehicle immobilizer device according to claim 4, wherein the immobilizer signal comprises first and second immobilizer signal components, the connection to the security system comprises a first immobilizer signal component connection carrying the first immobilizer signal component and a second immobilizer signal component connection carrying the second immobilizer signal component, the first immobilizer signal component not being identical to the second immobilizer signal component when the immobilizer signal is in the first immobilizer signal state.

8. A vehicle immobilizer device according to claim 4, wherein the biasing circuit comprises a voltage divider.

9. A vehicle immobilizer device according to claim 8, wherein the biasing circuit further comprises a low-pass filter.

10. A vehicle immobilizer device according to claim 4, further comprising the security system.

11. A vehicle immobilizer device according to claim 1, further comprising a switch connecting the first contact to the first source, wherein operation of the first system is enabled when the switch is closed and the first and second contacts are held together.

12. A vehicle immobilizer device according to claim 1, wherein the first system comprises an ignition system of the vehicle.

13. A vehicle immobilizer device according to claim 1, wherein the first system comprises an engine computer of the vehicle.

14. A vehicle immobilizer device according to claim 1, wherein the first system comprises a necessary system of the vehicle.

15. A vehicle immobilizer device according to claim 1, wherein the switching element further comprises third and fourth contacts electrically connected to a second system of the vehicle so that operation of the second system can be enabled when the third and fourth contacts are held together, and so that the second system is not operable when the third and fourth contacts are held apart, the switching element causing the third and fourth contacts to be held together when the control signal is in a first control signal state and causing the third and fourth contacts to be brought apart when the control signal is not in the first control state.

16. A vehicle immobilizer device according to claim 15, wherein the switching element comprises a relay energized when the control signal assumes the first control signal state, the relay being de-energized when the control signal is not in the first control signal state.

17. A vehicle immobilizer device according to claim 15, further comprising a switch connecting the first contact to the first source, wherein operation of the first system is enabled when the switch is closed and the first and second contacts are held together.

18. A vehicle immobilizer device according to claim 17, wherein the first system comprises a necessary system of the vehicle.

19. A vehicle immobilizer device according to claim 18, wherein the second system comprises a starter solenoid of the vehicle.

20. A vehicle immobilizer device according to claim 17, wherein the first system comprises an ignition system of the vehicle.

21. A vehicle immobilizer device according to claim 17, wherein the first system comprises an engine computer of the vehicle.

22. A vehicle immobilizer device according to claim 17, further comprising a terminal set capable of receiving a removable jumper, the terminal set connecting the first voltage to the biasing circuit through the removable jumper to cause the control signal to assume the first control state when the jumper is inserted into the terminal set and the immobilizer signal is not in the first immobilizer state.

23. A vehicle immobilizer device according to claim 15, further comprising a connection from supply voltage of the security system to the biasing circuit to cause the control signal to assume the first control state when the immobilizer signal is not in the first immobilizer state.

24. A vehicle immobilizer device according to claim 15, further comprising the security system.

25. A vehicle immobilizer device according to claim 15, wherein the immobilizer signal comprises first and second immobilizer signal components, the connection to the security system comprises a first immobilizer signal component connection carrying the first immobilizer signal component and a second immobilizer signal component connection carrying the second immobilizer signal component, the first immobilizer signal component not being identical to the second immobilizer signal component when the immobilizer signal is in the first immobilizer signal state.

26. A vehicle immobilizer device according to claim 15, wherein the biasing circuit comprises a voltage divider.

27. A vehicle immobilizer device according to claim 26, wherein the biasing circuit further comprises a low-pass filter.

28. A vehicle immobilizer device, comprising:
   a switching element comprising first and second contacts electrically connected to a first system of a vehicle so that operation of the first system can be enabled when the first and second contacts are held together, and so that the first system is not operable when the first and second contacts are apart, the first contact being connected to a first source carrying a first voltage, the switching element further comprising a control input capable of receiving a control signal, the switching element causing the first and second contacts to be held together when the control signal is in a first control signal state and causing the first and second contacts to be brought apart when the control signal is not in the first control state;
   a connection receiving an immobilizer signal from a security system, the immobilizer signal comprising first and second immobilizer signal components, the security system putting the immobilizer signal in a first immobilizer signal state when the security system determines to disable the vehicle, the first immobilizer signal component being different from the second immobilizer signal component when the immobilizer signal is in the first immobilizer signal state;
   means for causing the control signal to assume the first control state when the immobilizer signal is not in the first immobilizer signal state; and
   means for receiving the first voltage through the first and second contacts and causing the control signal to assume the first control state when the second contact is connected to the first source through the first contact and the immobilizer signal is not in the first immobilizer state.

29. A vehicle immobilizer device, comprising:
   a switching element comprising first and second contacts electrically connected to a first system of a vehicle so that operation of the first system can be enabled when the first and second contacts are held together, and so that the first system is not operable when the first and second contacts are apart, the first contact being connected to a first source carrying a first voltage, the switching element further comprising a control input capable of receiving a control signal, the switching element causing the first and second contacts to be held together when the control signal is in a first control signal state and causing the first and second contacts to be brought apart when the control signal is not in the first control state;
   a connection receiving an immobilizer signal from a security system, the immobilizer signal assuming a first immobilizer signal state when the security system determines to disable the vehicle, the immobilizer signal causing the control signal to assume the first control state when the immobilizer signal is not in the first immobilizer state; and
   means for receiving the first voltage through the first and second contacts and for causing the control signal to assume the first control state when the second contact is connected to the first source through the first contact and the immobilizer signal is not in the first immobilizer state.

30. A vehicle immobilizer device according to claim 29, wherein the switching element comprises a relay and the first and second contacts are normally open contacts of the relay.

31. A vehicle immobilizer device according to claim 29, wherein the first contact is connected to the first source through an ignition switch.

32. A vehicle immobilizer device according to claim 31, further comprising a terminal set capable of receiving a removable jumper, the terminal set connecting the first voltage to the biasing circuit through the removable jumper to cause the control signal to assume the first control state when the jumper is inserted into the terminal set and the immobilizer signal is not in the first immobilizer state.

33. A vehicle immobilizer device according to claim 31, wherein the immobilizer signal comprises first and second immobilizer signal components, the connection to the security system comprises a first immobilizer signal component connection carrying the first immobilizer signal component and a second immobilizer signal component connection carrying the second immobilizer signal component, the first immobilizer signal component not being identical to the second immobilizer signal component when the immobilizer signal is in the first immobilizer signal state.

34. A vehicle immobilizer, comprising:
   a relay comprising first and second normally open contacts, the first contact being connect to a first voltage source carrying a first voltage, the second contact being connected to a first system of a vehicle so that the first voltage can be provided to the first system to enable operation of the first system when the first and second contacts are closed, and so that the first system is not operable when the first and second contacts are open, the first contact being connected to the first voltage source, the relay further comprising first and second solenoid inputs, the first solenoid input being connected to a source of predetermined voltage, the second solenoid input receiving a control signal, the relay causing the first and second contacts to close when the control signal is in a first control signal state and causing the first and second contacts to open when the control signal is not in the first control state;
   a connection receiving first and second immobilizer signals from a security system;
   a self-biasing control circuit comprising:
      a first immobilizer connection receiving a first immobilizer input signal from a security system;
      a second immobilizer connection receiving a second immobilizer input signal from the security system;
      a biasing connection to the second contact;
      wherein the self-biasing control circuit causes the control signal not to be in the first control signal state when the first immobilizer input signal assumes a first level and the second immobilizer input signal assumes a second level substantially not equal to the first level.

35. A vehicle immobilizer according to claim 34, wherein the self-biasing control circuit further comprises a removable jumper receptacle connecting the self-biasing control circuit to the first voltage source.

36. A vehicle immobilizer according to claim 34, wherein the first system comprises an ignition solenoid of a vehicle.

37. A vehicle immobilizer according to claim 34, wherein the first system comprises an engine computer of a vehicle.

38. A vehicle immobilizer according to claim 34, wherein the source of predetermined voltage is the first voltage source.

39. A vehicle immobilizer, comprising:
   a relay comprising first and second normally open contacts, the first contact being connected to a voltage source carrying a first voltage, the second contact being connected to a first system of a vehicle so that the first voltage can be provided to the first system to enable operation of the first system when the first and second contacts are closed, and so that the first system is not operable when the first and second contacts are open, the relay further comprising first and second solenoid inputs, the first solenoid input being connected to the voltage source, the relay closing the first and second contacts when voltage on the second solenoid input does not exceed a first predetermined level;
   a control circuit comprising:
      a first immobilizer connection receiving a first immobilizer input signal;
      a second immobilizer connection receiving a second immobilizer input signal, the second immobilizer connection being coupled to the second solenoid input; and
      a switch coupled between the second solenoid input and a ground, the switch comprising a switch control input coupled to the first immobilizer connection so that the first immobilizer input signal controls state of the switch, the switch grounding the second solenoid input when the first immobilizer input signal is in a first state, the first state corresponding to voltage exceeding the first predetermined level; and
   a biasing circuit providing a biasing voltage from the second contact to the switch control input so that the switch grounds the second solenoid input when the first and second contacts are closed and the first immobilizer input signal assumes a high impedance state.

40. A vehicle immobilizer according to claim 39, wherein the biasing circuit comprises a first resistor coupled between the switch control input and ground, and a second resistor comprising first and second ends, the first end of the second resistor being coupled to the switch control input, the second end of the second resistor being coupled to the second contact.

41. A vehicle immobilizer according to claim 40, further comprising a jumper receptacle coupled between the voltage source and the second end of the second resistor, and a diode coupling the second end of the second resistor to the second contact, the diode being oriented so as to prevent current flow from the first contact to the second contact through the diode.

42. A vehicle immobilizer according to claim 40, further comprising a jumper receptacle and a first diode coupled in series between the voltage source and the second end of the second resistor, and a second diode coupling the second end of the second resistor to the second contact, the first and second diodes being oriented so as to prevent current flow between the first and second contacts through the first and second diodes.

43. A method of controlling operation of a vehicle, the method comprising:
   providing a control signal to a first switching element, the first switching element comprising a first contact and a second contact electrically connected to a first vehicle system so that operation of the first vehicle system can be enabled when the first and second contacts are held together, and so that the first vehicle system is not operable when the first and second contacts are held apart, the first contact being connected to a first voltage source carrying a first voltage, the first switching element further comprising at least one control input capable of receiving the control signal, the first switching element causing the first and second contacts to be held together when the control signal assumes a first control signal state and causing the first and second contacts to be brought apart when the control signal does not assume the first control signal state;
   providing an immobilizer signal from a security system, the immobilizer signal assuming a first immobilizer signal state when the security system determines to disable the vehicle, the immobilizer signal causing the control signal to assume the first control signal state when the immobilizer signal assumes the first immobilizer state; and providing the first voltage from the first voltage source to a biasing circuit through the first and second contacts, the biasing circuit causing the control signal to assume the first control state when the second contact is connected to the first voltage source through the first contact and the immobilizer signal is not in the first immobilizer state.

44. A method in accordance with claim 43, wherein the first switching element is in energized state when the control signal assumes the first control signal state, and the first switching element is in de-energized state when the control signal is not in the first control signal state.

45. A method in accordance with claim 44, further comprising a step of disabling the first vehicle system, the step of disabling comprising a step of disconnecting the first voltage source from the first contact.

46. A method in accordance with claim 45, wherein:
the first vehicle system comprises an ignition system, and the step of disabling comprises disabling the ignition system.

47. A method in accordance with claim 45, wherein the first vehicle system comprises an engine computer, and the step of disabling comprises disabling the ignition system.

48. A method in accordance with claim 45, further comprising a step of providing a supply voltage from the security system to the biasing circuit to cause the control signal to assume the first control state when the immobilizer signal is not in the first immobilizer state.

49. A method in accordance with claim 45, further comprising a step of providing the first voltage to the biasing circuit through a removable jumper to cause the control signal to assume the first control state when the jumper is inserted and the immobilizer signal is not in the first immobilizer state.

50. A method in accordance with claim 45, further comprising a step of providing the security system.

51. A method in accordance with claim 45, wherein the immobilizer signal comprises first and second immobilizer signal components, the first immobilizer signal component not being identical to the second immobilizer signal component when the immobilizer signal is in the first immobilizer signal state.

52. A method in accordance with claim 43, wherein the first switching element comprises a relay energized when the control signal assumes the first control signal state, the relay being de-energized when the control signal is not in the first control signal state, and the step of providing a control signal comprises a step of providing the control signal to the relay.

53. A method in accordance with claim 43, further comprising a step of providing the control signal to a second switching element, the second switching element comprising a third and fourth contacts electrically connected to a second vehicle system so that operation of the second vehicle system can be enabled when the third and fourth contacts are held together, and so that the second vehicle system is not operable when the third and fourth contacts are held apart, the second switching element further comprising at least one second control input capable of receiving the control signal, the second switching element causing the third and fourth contacts to be held together when the control signal assumes a first control signal state and causing the third and fourth contacts to be brought apart when the control signal does not assume the first control signal state.

54. A method in accordance with claim 53, wherein:
the first switching element comprises a first relay energized when the control signal assumes the first control signal state, the first relay being de-energized when the control signal is not in the first control signal state; and the second switching element comprises a second relay energized when the control signal assumes the first control signal state, the second relay being de-energized when the control signal is not in the first control signal state.

55. A method in accordance with claim 54, further comprising:
disabling the first vehicle system, the step of disabling the first vehicle system comprising a step of disconnecting the first voltage source from the first contact; and
disabling the second vehicle system.

56. A method in accordance with claim 54, further comprising a step of providing a supply voltage from the security system to the biasing circuit to cause the control signal to assume the first control state when the immobilizer signal is not in the first immobilizer state.

57. A method in accordance with claim 54, further comprising a step of providing the first voltage to the biasing circuit through a removable jumper to cause the control signal to assume the first control state when the jumper is inserted and the immobilizer signal is not in the first immobilizer state.

58. A method in accordance with claim 54, further comprising a step of providing the security system.

59. A method in accordance with claim 54, wherein the immobilizer signal comprises first and second immobilizer signal components, the first immobilizer signal component not being identical to the second immobilizer signal component when the immobilizer signal is in the first immobilizer signal state.

* * * * *